(12) United States Patent
Desch et al.

(10) Patent No.: US 12,036,925 B2
(45) Date of Patent: Jul. 16, 2024

(54) HOUSING, IN PARTICULAR FOR A SENSOR DEVICE

(71) Applicant: Hella Gmbh & Co. KGaA, Lippstadt (DE)

(72) Inventors: Eduard Desch, Hude-Wusting (DE); Oliver Schnock, Stuhr (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 1049 days.

(21) Appl. No.: 16/920,040

(22) Filed: Jul. 2, 2020

(65) Prior Publication Data

US 2021/0001777 A1 Jan. 7, 2021

(30) Foreign Application Priority Data

Jul. 5, 2019 (DE) ...................... 10 2019 118 217.4

(51) Int. Cl.
| | |
|---|---|
| B60R 1/04 | (2006.01) |
| F16B 2/02 | (2006.01) |
| F16B 2/20 | (2006.01) |
| G01D 11/24 | (2006.01) |
| B60R 1/12 | (2006.01) |

(52) U.S. Cl.
CPC .................. B60R 1/04 (2013.01); F16B 2/02 (2013.01); F16B 2/20 (2013.01); G01D 11/245 (2013.01); *B60R 2001/1223* (2013.01)

(58) Field of Classification Search
CPC ..... B60R 1/04; B60R 2001/1223; F16B 2/02; F16B 2/20; G01D 11/245
USPC ....................................................... 359/871
See application file for complete search history.

(56) References Cited

U.S. PATENT DOCUMENTS

| | | | | |
|---|---|---|---|---|
| 3,292,223 | A | 12/1966 | Esposito, Jr. | |
| 7,726,623 | B2 * | 6/2010 | Muller | B60R 1/04 |
| | | | | 248/475.1 |
| 8,456,311 | B2 * | 6/2013 | Wohlfahrt | F16M 13/02 |
| | | | | 73/170.17 |
| 9,244,249 | B2 * | 1/2016 | Kim | B60R 1/04 |
| 11,254,264 | B2 * | 2/2022 | Sugimura | B60R 1/12 |

(Continued)

FOREIGN PATENT DOCUMENTS

| | | |
|---|---|---|
| DE | 15 85 685 A | 10/1970 |
| DE | 31 38 418 A1 | 4/1983 |

(Continued)

OTHER PUBLICATIONS

Search Report issued in corresponding DE application No. 10 2019 118 218.2 created on Mar. 3, 2020.

*Primary Examiner* — Ricky D Shafer
(74) *Attorney, Agent, or Firm* — MUNCY, GEISSLER, OLDS & LOWE, P.C.

(57) ABSTRACT

In a housing, particularly a housing for a sensor apparatus, with a retaining clip for attaching the housing to an object, particularly to the insider of a motor vehicle windscreen. The retaining clip is connected to an outer surface of the housing, it is provided as essential that at least one outer surface has a clamping projection, that the retaining clip has a fastening region, that the fastening region has at least two clamping sections, and that a non-positive connection is formed between the clamping projection and the clamping sections. Further aspects relate to a sensor apparatus with a housing and a motor vehicle with a housing.

12 Claims, 2 Drawing Sheets

(56) References Cited

U.S. PATENT DOCUMENTS

| | | | |
|---|---|---|---|
| 2014/0055617 A1* | 2/2014 | Minikey, Jr. | B60R 11/00 |
| | | | 348/148 |
| 2016/0016518 A1* | 1/2016 | Jeon | B60R 1/04 |
| | | | 359/881 |
| 2019/0176705 A1* | 6/2019 | DeMaagd | F16B 1/00 |

FOREIGN PATENT DOCUMENTS

| | | |
|---|---|---|
| DE | 20 2009 001 790 U1 | 5/2009 |
| DE | 20 2009 001 735 U1 | 7/2009 |
| DE | 10 2012 105 518 A1 | 1/2014 |
| GB | 2 352 269 A | 1/2001 |

* cited by examiner

HOUSING, IN PARTICULAR FOR A SENSOR DEVICE

BACKGROUND OF THE INVENTION

Field of the Invention

The invention relates to a housing, particularly a housing for a sensor apparatus, with a retaining clip for attaching the housing to an object, particularly to the inside of a motor vehicle windscreen, wherein the retaining clip is attached to the outer surface of the housing.

Brief Description of the Related Art

Housings for sensor apparatuses which are equipped with a retaining clip for fastening to an object are used in the automotive field, for example. The housings may serve as a housing for a rain-light sensor, for example, which is intended for placement on the inside of a motor vehicle windscreen. In the case of a rain-light sensor, the sensor apparatus must be attached securely, particularly pressed against the windscreen. For this purpose, the housings of rain-light sensors may be equipped with retaining clips, with which the sensor housing is pressed against the windscreen.

It is known to fasten the retaining clip to the housing by means of thermomechanically reshaped plastic nubs. In such cases, the housing is furnished with at least two plastic nubs, which are inserted through corresponding openings in the retaining clips. A positive locking connection is created by reshaping the plastic nubs thermomechanically after placement of the retaining clip.

The disadvantage of the process is that the thermomechanical reshaping entails increased installation effort, and that the reshaping operation, that is to say the fastening of the clip must be inspected. Furthermore, due to the thermomechanical reshaping it is not possible to detach the retaining clip from the sensor housing without damaging it.

SUMMARY OF THE INVENTION

The object underlying the invention is to suggest a housing with which it is possible to release the connection between the retaining clip and the housing non-destructively.

This object is solved with a housing and a sensor apparatus having the features of the independent claims. Further developments and advantageous variants are described in the subordinate claims.

In a housing, particularly a housing for a sensor apparatus, with a retaining clip for attaching the housing to an object, particularly to the inside of a motor vehicle windscreen, wherein the retaining clip is connected to an outer surface of the housing, it is provided as essential to the invention that at least one outer surface has a clamping projection, that the retaining clip has at least one fastening region, that at least one fastening region has at least two clamping sections, and that a non-positive connection is established between at least one clamping projection and at least two clamping sections. The housing has a retaining clip, with which the housing can be fastened to an object, particularly to the motor vehicle windscreen. The retaining clip preferably consists of a metallic material and has resilient properties. The housing has an outer surface, to which a fastening region of the retaining clip is fastened. For this purpose, the outer surface of the housing has a clamping projection. The clamping projection in this case may be constructed in the form of a plastic nub and may have a circular cross-section. The retaining clip has a fastening region which is brought into contact with the surface of the housing on which the clamping projection is located. In order to create a non-positive connection, the fastening region of the retaining clip includes at least two clamping sections, wherein the non-positive connection is created between the clamping sections and the clamping projection. The clamping sections may be flat areas of the fastening region on the retaining clip arranged opposite each other and between which the clamping projection is clamped. Through the creation of a non-positive connection between the clamping sections of the fastening region on the retaining clip and between the clamping projection the housing, connection is created between the retaining clip and the housing which is secure but can also be disconnected non-destructively. Moreover, rapid installation is enabled, since no thermomechanical reshaping steps of any kind are necessary.

In a further development of the invention, the clamping projection has a circular cross-section. The clamping projection is preferably designed as a nub, that is to say a cylindrical structure. Because of the circular cross-section of the clamping projection, it is possible that a non-positive connection is created by the clamping sections of the fastening region on the retaining clip exerting lateral bearing pressure, thereby preventing the retaining clip from slipping off the fastening projection. The circular cross-section of the clamping projection allows the retaining clip to twist about the clamping projection, so that the retaining clip can assume various fastening positions on the housing.

In a further development of the invention, the clamping projection is clamped between two clamping sections of the retaining clip. The retaining clip may have exactly two clamping sections which are arranged opposite each other. The clamping projection of the housing is accommodated between the clamping sections in such manner that the clamping projection is clamped between the clamping sections.

In a further development of the invention, the distance between the clamping sections in the unloaded state is smaller than the diameter of the clamping projection. In the unloaded, i.e. unmounted state, the distance between the clamping sections of the retaining clip is smaller than the diameter of the clamping projection of the housing. During installation, the non-positive connection between the clamping sections and the clamping projection resulting therefrom is thus created by the inherent stability of the clamping sections.

In a further development of the invention, an opening is formed between the borders of the clamping sections that face each other, and at least sections of the borders of the clamping sections which form the opening are adapted to the size and shape of the clamping projection. The clamping projection is preferably cylindrical in shape. The clamping sections that are located opposite each other in the fastening region of the retaining clip are substantially of flat construction. The edges of the clamping sections which face each other together form an opening which is designed to accommodate the clamping projection. In particular, sections of the edges are adapted to match the shape of the cross-section of the clamping projection, particularly the circular cross-section of the clamping projection. Each of the clamping sections thus forms a section which is designed to bear flush against the clamping projection. As the distance between the edges of the clamping sections that face each other is smaller than the diameter of the clamping projection, a radial clamping force is generated, and therewith a non-positive connection.

In a further development of the invention, the retaining clip has a fastening region and two spring regions, and the plane spanned by the fastening region forms an angle with each of the planes spanned by the spring regions. The fastening region of the retaining clip is designed to bear flush against an area of the outer surface of the housing. Spring regions with are provided for fastening the housing to an object extend laterally from the fastening region, which constitutes the middle region of the retaining clip. The fastening region spans a plane which is aligned parallel to the outer surface of the housing at least in sections. The planes spanned by the spring regions are each aligned at an angle to the fastening region and thus also to the outer surface of the housing in the mounted state. In particular, the planes of the spring regions form the same angles with the outer surface of the housing. In particular, the planes of the spring regions may span an angle of less than 20° with the outer surface of the housing. Consequently, the retaining clip exerts a bias by which the housing can be clamped to an object.

In a further development of the invention, the clamping sections each have at least one bead. The beads of the clamping sections are arranged to the sides of the clamping section edges which form the opening. The beads lend the clamping sections greater inherent stability, so that a strong radial clamping force can be generated here between the clamping projection of the housing and the clamping sections.

In a further development of the invention, the clamping sections are of substantially flat construction, the clamping sections have recesses on the outer edge thereof farthest from the opening, and at least one bulge corresponding to the recesses is arranged on the outer surface. The clamping sections each have at least one recess, preferably two or more recesses, on the outer sides thereof farthest from the clamping projection. The retaining clip may have a symmetrical shape, wherein in the mounted state the axis of transverse symmetry passes through the midpoint of the clamping projection. The recesses may be semicircular in shape and arranged on both sides of the axis of transverse symmetry of the retaining clip. In corresponding manner, bulges are provided on the outer surface of the housing, which includes the clamping projection and are arranged in opposing pairs on a line passing through the midpoint of the clamping projection. For example, the bulges may be conformed on stiffening elements on the outer surface. The stiffening elements are provided in order to stiffen the outer surface of the housing. The bulges in the stiffening elements are thus positioned exactly opposite each other. When the retaining clip and the housing are joined, that is to say when a non-positive connection is created between the clamping sections and the clamping projection, the bulges on the stiffening elements may each engage in a recess on the clamping sections. In this way, the retaining clip is prevented from twisting sideways about the clamping projection. Thus, because of the various recesses in the clamping sections it becomes possible to place the retaining clip in various positions on the housing, wherein each position is secured against twisting sideways.

In one embodiment of the invention, the retaining clip is manufactured as a single part, and the opening and the clamping sections are formed by a cutout, particularly by a punched out section. The retaining clip is preferably produced from a single piece of material, for example a piece of sheet metal. The opening between the clamping sections as well as the clamping sections themselves may be created by punching a section out of the metal sheet. The cutout lends the clamping sections good inherent stability, so that a strong radial clamping force on the clamping projection can be achieved. The angles that are formed between the spring regions and the fastening section may be obtained correspondingly by pressing in a mould. This enables a way to produce the retaining clip simply and cost-effectively.

In one embodiment of the invention, the fastening region spans a plane and the plane is aligned parallel to the outer surface of the housings at least in portions thereof. The fastening region spans a plane which is aligned parallel to the outer surface of the housing at least in sections thereof. The parallel alignment of the fastening region of the retaining clip and the flat outer surface of the housing creates a particularly secure connection between the retaining clip and the housing. The fastening region of the retaining clip has at least two clamping sections, wherein a non-positive connection is created between the clamping sections and the clamping projection of the housing. The clamping sections of the fastening regions are arranged opposite each other in one plane, so that the clamping projection of the housing can be accommodated between the clamping sections. In this way, a non-positive connection is created between the fastening region and the clamping projection in the plane spanned by the clamping sections of the fastening region.

A further aspect of the invention relates to a retaining clip for a housing according to the invention. The retaining clip has at least one fastening region, wherein the fastening region has at least two clamping sections. The clamping sections are constructed to create a non-positive connection with a clamping projection of a housing. The retaining clip serves to fasten the housing to an object, the motor vehicle windscreen for example. The retaining clip is preferably made from a metallic material and has resilient properties. The clamping projection of the housing may be constructed in the form of a plastic nub and have a circular cross-section. The clamping sections of the fastening region may be flat areas of the fastening region which are arranged opposite to each other. The clamping projection of the housing is clamped between den clamping sections. The clamping sections of the fastening region that are arranged opposite each other are of substantially flat construction. The edges of the clamping sections which face each other together form an opening which is designed to accommodate the clamping projection of the housing. Particularly sections of the edges are adapted to match the shape of the cross-section of the clamping projection, particularly the circular cross-section of the clamping projection. Each of the clamping sections thus forms a section which is designed to bear flush on the clamping projection. Because the distance between the edges of the clamping section that face each other is smaller than the diameter of the clamping projection, a radial clamping force is generated, and consequently a non-positive connection with the outer surface of the housing as well. The retaining clip may have a fastening region and two spring regions, wherein the plane spanned by the fastening region spans an angle with each of the planes spanned by the spring regions. The angled arrangement has the effect of biasing the retaining clip, which in turn enables housing to be clamped to an object.

A further aspect of the invention relates to a sensor apparatus with a housing according to the invention. The sensor apparatus may be a rain-light sensor for a motor vehicle for example. Because of the retaining clip, the housing of the sensor apparatus may be clamped to the windscreen of a motor vehicle with corresponding fastening counterparts. The retaining clip enables the sensor apparatus to be mounted and disassembled quickly. It is also possible to disconnect the retaining clip non-destructively in the event of a defective, sensor apparatus, for example, so that the retaining clip can be reused.

A further aspect of the invention relates to a motor vehicle with a housing according to the invention.

BRIEF DESCRIPTION OF THE DRAWINGS

In the following text, the invention will be explained in greater detail with reference to an embodiment represented in the drawing. In detail, the schematic diagrams in the drawing show.

DETAILED DESCRIPTION OF THE PREFERRED EMBODIMENTS

Figure 1:
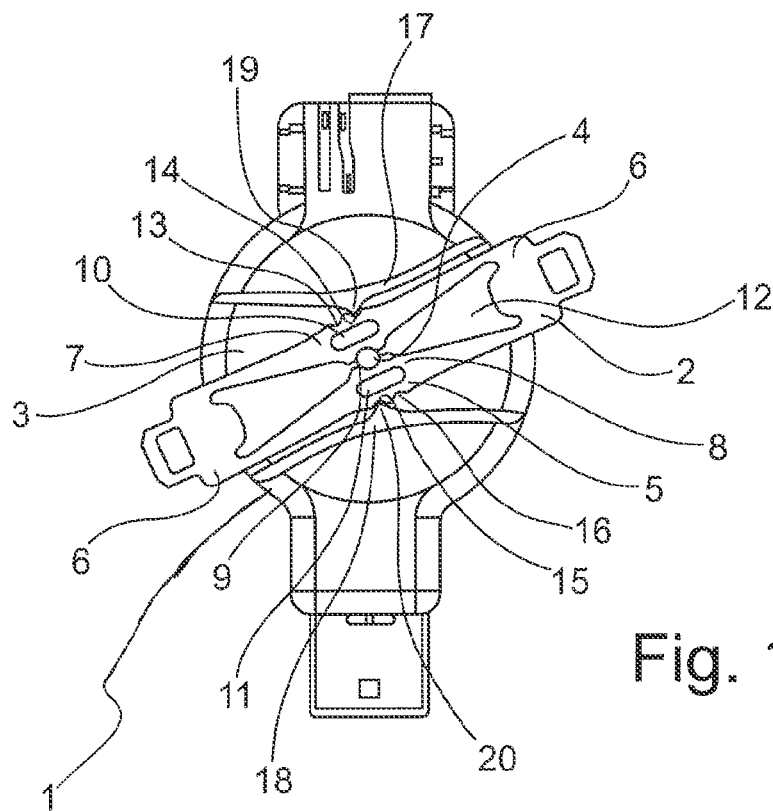
FIG. 1: the housing of a sensor apparatus with a retaining clip.

FIG. 1 represents a housing 1 with a retaining clip 2 fastened thereto. The retaining clip 2 is arranged on an outer surface 3 of the housing 1 by means of a clamping projection 4. The clamping projection 4 protrudes out of the outer surface 3 and is constructed cylindrically in the form of a nub. The retaining clip 2 has a fastening region 5, and spring regions 6 which extend laterally therefrom. The fastening region 5 has clamping sections 7, 8. The clamping sections 7, 8 are arranged opposite to each other and form an opening 9 in which the clamping projection 4 may be accommodated. A non-positive connection may be created between the clamping sections 7 and 8 and the outer wall of the clamping projection 4 as a result of the inherent stability of the clamping sections 7 and 8 and due to the fact that the opening 9 has a smaller diameter than the clamping projection 4. In order to increase the inherent stability and thus also increase the radial clamping force, the clamping sections 7 and 8 each have a bead 10, 11. The retaining clip 2 is preferably made from a single piece of material, a piece of sheet metal for example, wherein the opening 9 and cutouts by which the clamping sections 7, 8 are formed are created by a punched out part 12. The outer sides of the clamping sections 7, 8 are furnished with recesses 13-16. In particular, the recesses 13-16 may be semicircular in shape. In order to limit the ability of the retaining clip 2 to move in the plane parallel to the outer surface 3, the outer surface 3 of the housing 1 is furnished with bulges 19, 20. In addition, the recesses 13-16 correspond to the bulges 19, 20. Stiffening elements 17, 18 are arranged on the outer surface 3 and are provided to stiffen the outer surface 3. The bulges 19, 20 may be conformed on the stiffening elements 17, 18. The recesses 13-16 are reach arranged on both sides of the axis of transverse symmetry 21 of the retaining clip 2. During mounting, the bulges 19, 20 in the stiffening elements 17, 18 may each engage in one of the recesses 13-16, thereby enabling various orientations of the retaining clip 2 on the housing 1.

Figure 2:
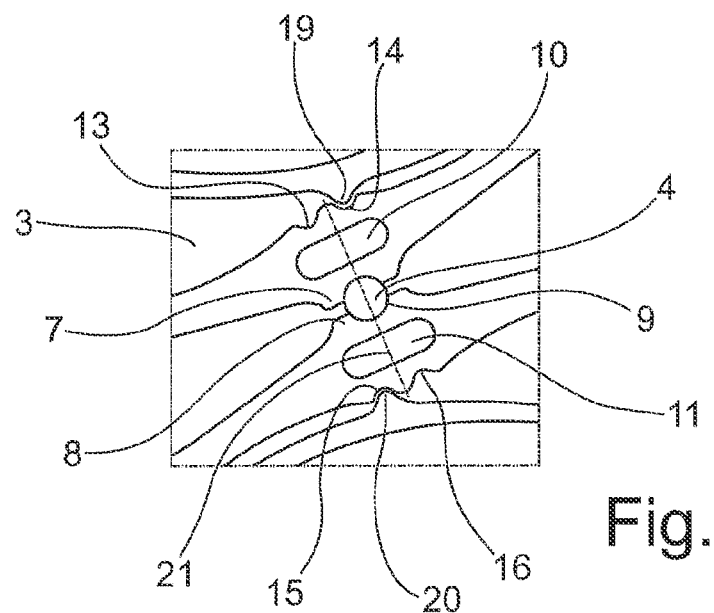
FIG. 2: a detail view of the housing of FIG. 1.

FIG. 2 represents a detail view of the fastening of the retaining clip 2 to the housing 1. The clamping sections 7, 8 are furnished with recesses 13-16 which are arranged on both sides of the axis of transverse symmetry 21. The recesses 13-16 correspond to the bulges 19, 20, which dictate the orientation of the retaining clip 2 on the housing 1.

Figure 3:
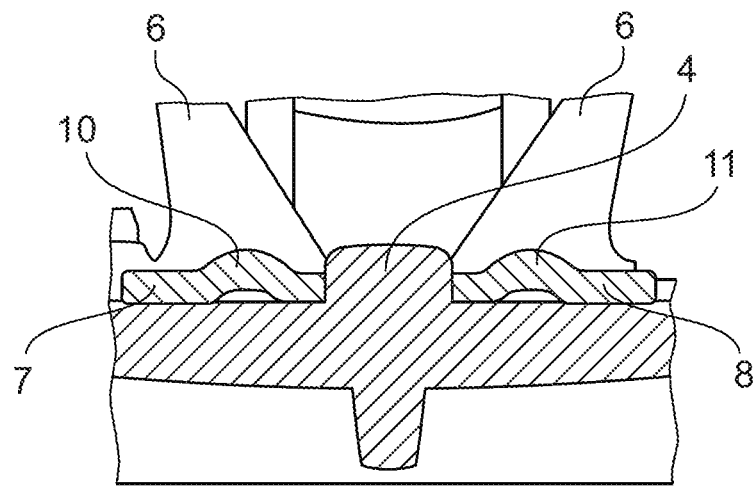
FIG. 3: a cross-sectional view of the housing of FIGS. 1 and 2.

FIG. 3 represents a side view of the cross-section through the axis of transverse symmetry 21 of the retaining clip 2 when mounted on the housing 1. Due to the inherent stability of the clamping sections 7, 8 and because the diameter of the clamping projection 4 is larger than the opening 9, a radial clamping force is generated and therewith also a non-positive connection between the retaining clip 2 and the housing 1.

Figure 4:
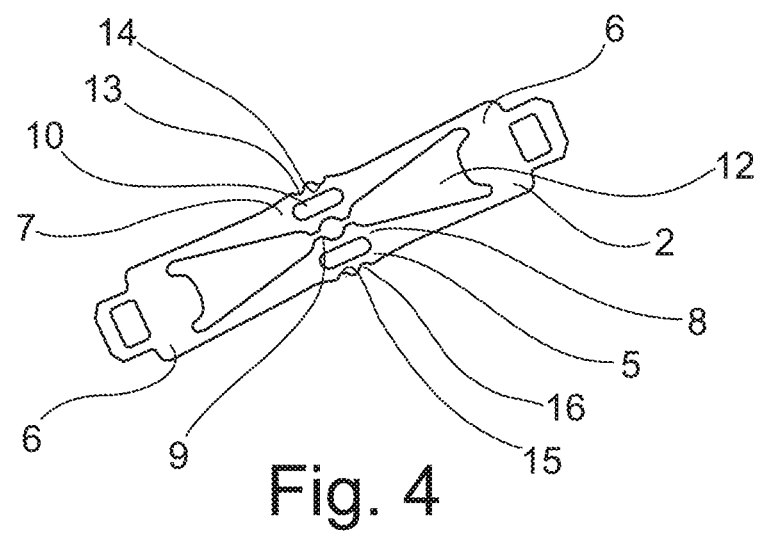
FIG. 4: a retaining clip for a housing.

FIG. 4 represents a retaining clip 2 for a housing 1 according to FIG. 1. The retaining clip 2 includes a fastening region 5 and spring regions 6 which protrude laterally. The clamping sections 7, 8 form, an opening 9, through which a non-positive connection with the clamping projection 4 of the housing 1 can be created.

All of the features described in the preceding description and the claims can be combined in any permutation with all of the features of the independent claims. The disclosure of the invention is thus not limited to the feature combinations that are described and/or claimed, but rather all feature combinations which are practicable within the scope of the invention are to be considered disclosed.

The invention claimed is:

1. A housing with a retaining clip for fastening the housing to an object, wherein the retaining clip is fastened to an outer surface of the housing,
   wherein
   the outer surface has at least one clamping projection,
   the retaining clip has at least one fastening region,
   the at least one fastening region has at least two clamping sections, and
   a non-positive connection is created between the clamping projection and the at least two clamping sections of the at least one fastening region,
   wherein the at least two clamping sections are furnished with recesses on outer edges thereof farthest from an opening, and that at least one bulge corresponding to the recesses is arranged on the outer surface of the housing.

2. The housing according to claim 1 wherein the clamping projection has a circular cross-section.

3. The housing according to claim 1, wherein the clamping projection is clamped between the at least two clamping sections of the retaining clip.

4. The housing according to claim 1, wherein a distance between the at least two clamping sections in an unloaded state is smaller than a diameter of the clamping projection.

5. The housing according to claim 1, wherein the opening is created between edges of the clamping sections that face each other, and the edges of the at least two clamping sections which form the opening are adapted to size and shape and of the clamping projection at least in portions thereof.

6. The housing according to claim 1, wherein the retaining clip has the fastening region and two spring regions, and that a plane spanned by the fastening region forms an angle with each of the planes spanned by the spring regions.

7. The housing according to claim 1, wherein the at least two clamping sections are each furnished with at least one bead.

8. The housing according to claim 1, wherein the retaining clip is manufactured from a single piece, and that the opening and the at least two clamping sections are formed by a cutout.

9. The housing according to claim 1, wherein the fastening region spans a plane, and that the plane is aligned parallel to the outer surface of the housing at least in portions thereof.

10. A sensor apparatus with the housing according to claim 1.

11. A motor vehicle with the housing according to claim 1.

12. A housing with a retaining clip for fastening the housing to an object, wherein the retaining clip is fastened to an outer surface of the housing,
wherein
the outer surface has at least one clamping projection,
the retaining clip has at least one fastening region,
the at least one fastening region has at least two clamping sections, and
a non-positive connection is created between the clamping projection and the at least two clamping sections of the at least one fastening region,
wherein the at least two clamping sections are furnished with recesses on outer edges thereof farthest from an opening, and that bulges corresponding to the recesses are arranged on the outer surface of the housing, and
wherein the bulges are arranged in opposing pairs on a line passing through a midpoint of the clamping projection.

* * * * *